United States Patent [15] 3,665,202
McLeman [45] May 23, 1972

[54] APPARATUS FOR DETECTING OBJECTS

[72] Inventor: Alexander D. McLeman, Corby, England

[73] Assignee: British Steel Corporation, London, England

[22] Filed: May 25, 1970

[21] Appl. No.: 40,195

[30] Foreign Application Priority Data

June 2, 1969 Great Britain......................27,900/69

[52] U.S. Cl. ..............250/237 R, 250/219 LG, 250/219 WD, 250/235
[51] Int. Cl. ........................................................H01j 3/14
[58] Field of Search ........178/DIG. 1; 250/219 WD, 219 LG, 250/220, 221, 222, 233, 219 LG, 231, 235, 237; 356/157, 158, 163

[56] References Cited

UNITED STATES PATENTS 3,541,337 11/1970 Brandenburg..................250/219 WD

Primary Examiner—James W. Lawrence
Assistant Examiner—D. C. Nelms
Attorney—Brady, O'Boyle & Gates

[57] ABSTRACT

In apparatus for detecting an object by scanning two parallel paths having means for producing signals from radiation sensed by the scanning, an improvement comprises means for inhibiting the signal producing means at the limits of the scans. The inhibiting means comprise a shutter mounted for movement in synchronism with the scanning.

3 Claims, 7 Drawing Figures

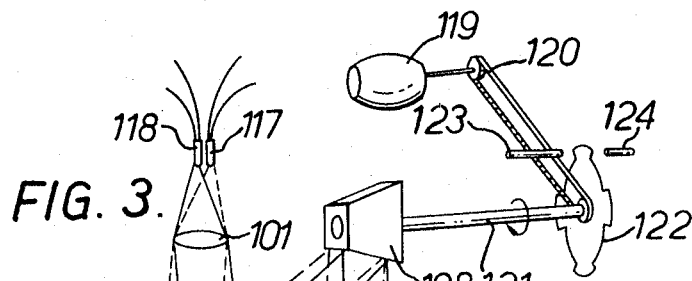
FIG. 3.
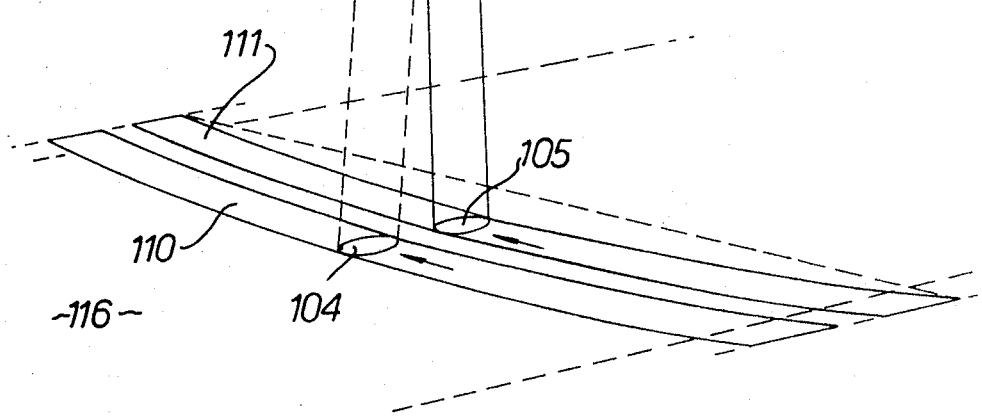

APPARATUS FOR DETECTING OBJECTS

The present invention relates to apparatus for detecting an object.

Detection of objects is sometimes required for tracking and length or speed measuring systems, for example in a steel bar rolling mill for detecting bars leaving a mill.

In co-pending Patent Application Ser. No. 838,301, to Robert A. Senior, et al., filed 1st July 1969, and owned by the assignee of the present application, there is disclosed apparatus for detecting an object which comprises a scanning arrangement for scanning two parallel paths and a radiation responsive arrangement co-operating with the scanning arrangement and comprising a pair of photo-diodes arranged to receive scanned radiation through respective apertures.

With this prior apparatus, the lengths of the scans are limited by the edges of the apertures. However, since the lens is arranged to focus onto the photo-diodes images of points where the objects to be detected may be present the edges of the apertures will appear out of focus to the photo-diodes, and it is impossible to achieve a sharply defined cut-off simultaneously on the two scans.

It is an object of the present invention to provide an improved apparatus for detecting an object by means of two scans wherein means are provided for sharply and simultaneously cutting off both scans at the ends thereof.

According to the present invention, means are provided for inhibiting the radiation responsive means at and adjacent the limits of the scans.

Further objects, features and advantages of the invention will appear from the following description of the apparatus illustrated in the accompanying drawings, in which:

FIG. 3 shows diagrammatically the apparatus of the present invention;

Figure 1:
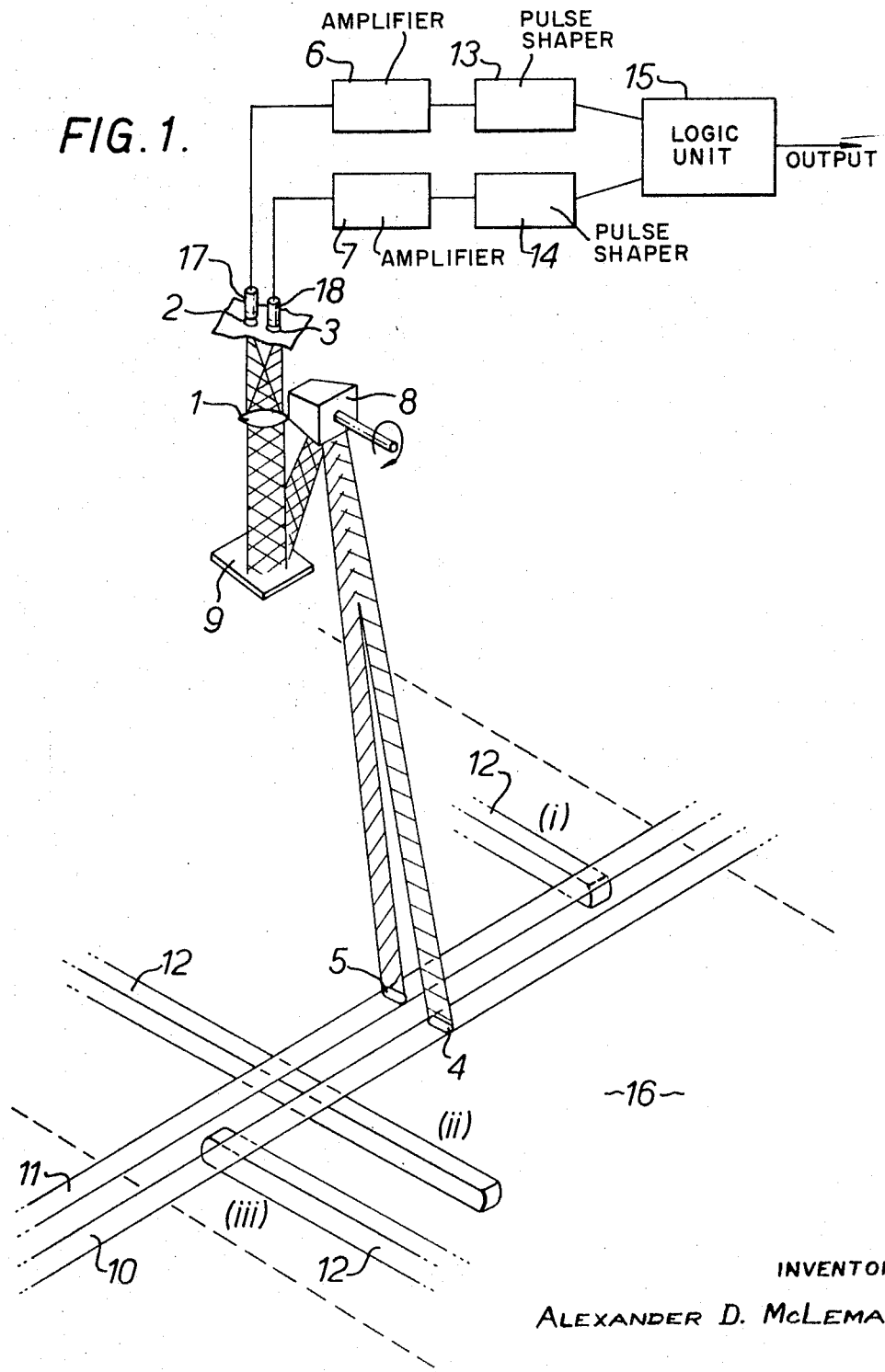
FIG. 1 shows diagrammatically an apparatus according to the aforesaid Patent Application Ser. No. 838,301 for detecting an object.

Referring to FIG. 1, a lens 1 is used to focus an image of two small areas 4 and 5 of a roller table 16 (indicated in dotted lines) through two apertures 2 and 3 respectively. Behind these aperture are two photo-electric devices 17 and 18 respectively whose electrical response is proportional to the amount of radiation coming through the apertures; i.e. to the radiation from the two small areas of the roller table under examination. Photo-electric devices 17 and 18 are connected respectively to amplifiers 6 and 7 and the outputs of the two amplifiers 6 and 7 are passed respectively to pulse shapers 13, 14 and thence to a logic unit 15. The photo-electric devices 17 and 18 are conveniently photo-diodes each connected in the biasing circuit of the associated amplifier 6 or 7. The amplifiers 6 and 7 are conventional A C pulse amplifiers designed to supply an output voltage when the resistance of the associated photo-diode 17 or 18 falls sufficiently i.e. when a sufficient quantity of radiation impinges on the photo-diode. The two small areas of the roller table exposed to the photo-diodes 17, 18 are constantly changed along paths 10 and 11 respectively transversely of the roller table by scanning means in the form of a rotating four-sided mirror 8 which reflects the images onto a fixed mirror 9 which in turn reflects the images to the lens 1. The paths 10 and 11 may overlap each other slightly.

If a red hot bar 12 is in position (i) relative to the paths scanned there is sufficient radiation directed from the bar 12 to the photo-diode 18 to produce an output signal from the amplifier 7 while there is insufficient radiation directed to the photo-diode 17 to produce an output signal from the amplifier 6. As radiation from the bar 12 impinges intermittently on the photo-diode 18 due to the rotation of the mirror 8, the output signal from the amplifier 7 is a series of pulses.

If a bar 12 is in position (ii) relative to the scanned paths 10 and 11 both amplifiers 6 and 7 will produce an output signal. Similarly with a bar in position (iii) only the amplifier 6 will produce an output signal.

The unit 15, using conventional electronic logic techniques, can detect which ever of the three above conditions (i, ii, or iii of FIG. 1) is desired.

Figure 2:
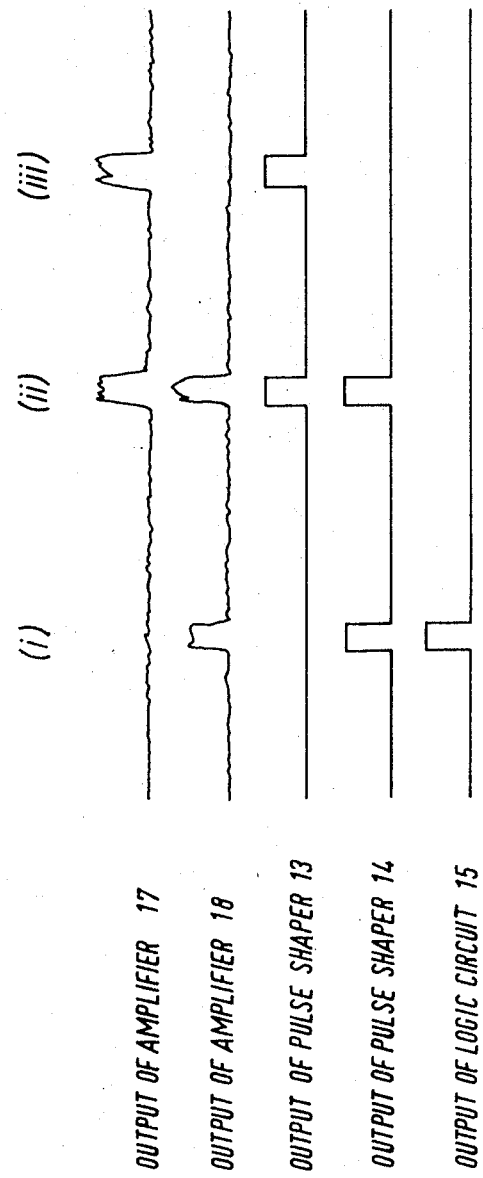
FIG. 2 is a graphic representation of signals produced by the apparatus of FIG. 1.
Figure 4:
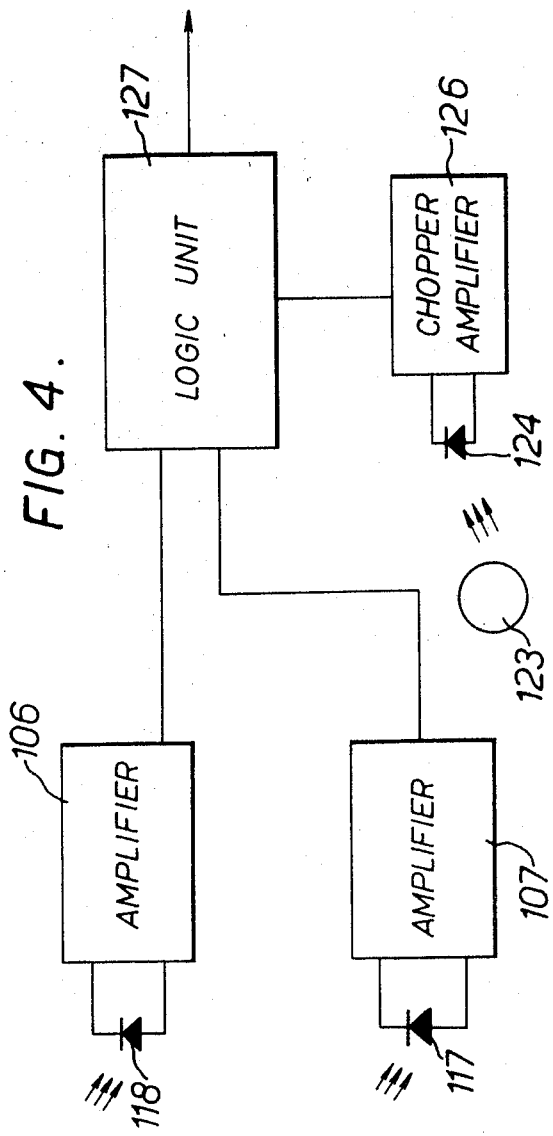
FIG. 4 is a schematic block diagram of the electrical circuit for the apparatus of FIG. 3.

For example if it is desired to detect the front end of a bar, (condition *i*,) the output of the logic unit would be as shown in FIG. 2. It should be noted that in this case the device would ignore any bars in positions (ii) or (iii) of FIG. 1, i.e. the device would detect the front of a bar even if the other bars are lying in the path scanned. At (i) (ii) and (iii) in FIG. 2 are shown the signals by the amplifiers 6, 7 the pulse shapers 13, 14 and the logic unit 15 in response to objects at positions (i), (ii) and (iii) respectively of FIG. 1.

The pulse shapers 13 and 14 and the logic unit 15 may conveniently be combined in a logic circuit comprising MEL Series 10 circuit blocks arranged (for condition 1) to produce an output only if the amplifier 7 is at logic '1' and the amplifier 6 is at logic '0'. The logic circuit is provided with a delay circuit delaying for 40 $\mu$ sec the output signal, so that in the event of the photo-diode 18 being less sensitive than the photo-diode 17 and hence the leading edge of the output pulses of the amplifier 7 lagging the leading edge of the output pulses of the amplifier 6, a false detection is prevented.

With the above-described apparatus, the lengths of the scans are limited by edges of the apertures 2 and 3. However, this arrangement has the disadvantage that the limits of the scans maynot 72 be sufficiently precise for some applications since the lens 1 is arranged to focus on the photo-diodes 17 and 18 images of points where the bars 12 to be detected may be present and any other objects (e.g. the edges of the apertures 2 and 3) between said points and the lens will appear out of focus to the photo-diodes. Thus, the edges of the apertures 2 and 3 appear out of focus and it is impossible to achieve a sharply defined cut-off simultaneously on the two scans. The scans may therefore be unequal in length and consequently an object (e.g. a hot bar) to be detected lying adjacent a scan extremity may be detected by only one of the photo-diodes instead of two. The logic unit 15 is then presented with false information and will give an incorrect output.

The apparatus according to the present invention, shown in FIGS. 3 through 7, in which parts which correspond to those in FIG. 1 have been indicated by the corresponding reference numerals in the 100 series, has been designed to avoid such inaccuracy. In this apparatus, the rotating mirror 108 is driven by a motor 119 through a drive belt 120 and a spindle 121 on which the mirror is mounted. Also mounted on the spindle 121 is a chopper disc 122 having four vanes equally spaced apart round its periphery. A Ga As cell 123 serving as a source of infra-red radiation and a photo-diode 124 serving as an infra-red detector are arranged on opposite sides of the disc 122 in positions such that the vanes on the disc intermittently prevent radiation from the cell 123 from falling on the photo-diode 124. The photo-diode 124 gives an output only when no vane is present between it and the cell 123. The output from the photo-diode is amplified,and by an amplifier 126 (FIG. 4) applied to a logic unit 127 to inhibit the output from the logic unit 127. The disc 122 is located on the spindle 121 so that each vane corresponds with a side of the mirror 108. The leading edge of each vane determines when the output from the logic unit 127 ceases to be inhibited, and thus the effective starting point of each scan, and therefore must be accurately set relative to the corresponding side of the mirror 108. The vane width determines the time that the logic unit output is not inhibited, and therefore the effective length of the scan. The logic unit 127 will give an output signal only if the following conditions are satisfied:

a. Amplifier 106 output at logic '1' (i.e. billet detected)

b. Amplifier 107 output at logic '0' (i.e. no billet detected)
c. The chopper amplifier 126 at logic '1'

If a billet were in such a position that it was detected by both of the photo-diodes 117 and 118, there is a possibility that the amplifier 106 would produce an output before the amplifier 107, due to the variation in the sensitivities of the photo-diodes 117 and 118. If the leading edges of the output pulses of the amplifier 106 did not coincide with those of the amplifier 107, the logic unit could recognize this as being a correct state (i.e. amplifier 106 at logic '1' and amplifier 107 at logic '0') and produce a false output.

A delay circuit is therefore incorporated in the logic unit 127 to inhibit the output for approximately 40μ sec after detection by amplifier 106, by which time amplifier 107 will have produced a detection signal.

Figure 5:
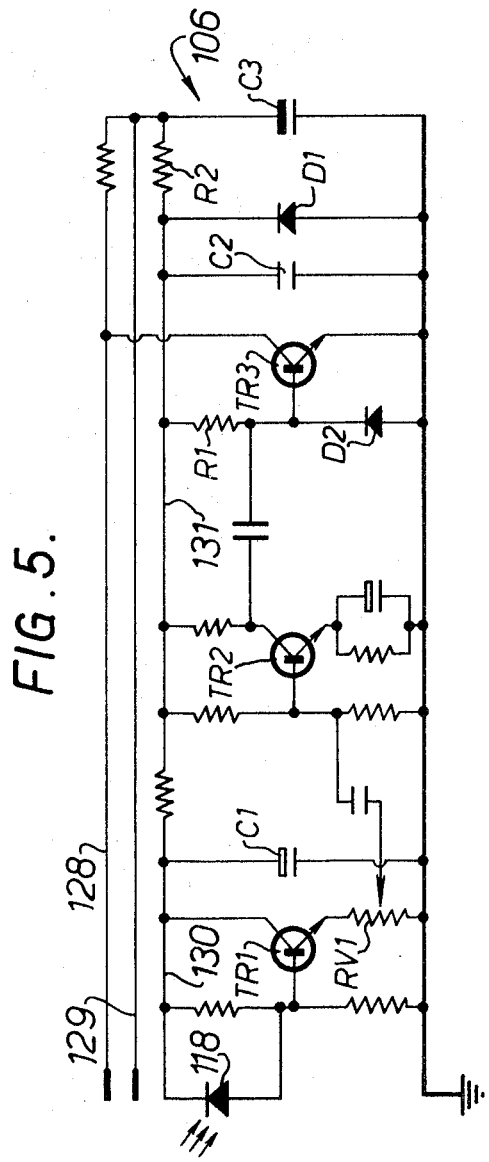
FIG. 5 is an electrical schematic diagram of one of the amplifier circuits designated in FIG. 4.

A circuit diagram of the amplifier 106 is shown in FIG. 5, the amplifier 107 being similar. Transistors TR1 and TR2, with their associated resistors, form a conventional AC pulse amplifier driving an output transistor TR3. During steady state conditions (i.e. no billet being detected) the transistors TR1 and TR2 are conducting slightly, and the transistor TR3 is biased to saturation by resistor R1. The amplifier output from the collector of the transistor TR3 is at logic '0'.

When the photo-diode 118 detects a billet, its resistance falls, and forward biases the transistor TR1 causing it to conduct heavily. The charge on the emitter of the transistor TR1 is AC coupled to the base of the transistor TR2, forward biasing the latter and causing it to saturate. The fall on the collector of the transistor TR2 reverse biases the transistor TR3, cutting it off, and the amplifier output on an output conductor 128 switches rapidly to a positive voltage.

The photo-diode 118 detects the billet intermittently, due to the rotation of the mirror 108, and thus generates a series of pulses in the amplifier 106. A variable resistor RV1 controls the width of the pulse from the amplifier 106 by controlling the gain, and hence the period of saturation, of the transistor TR2.

Conductor 131 is referenced to a positive voltage by zener diode D1, a resistor R2 and the positive supply voltage on conductor 129. Capacitor C1, C2 and C3 decouple conductors 129, 130 and 131 and a diode D2 on the base of the transistor TR3 limits the negative voltage of the base.

Figure 6:
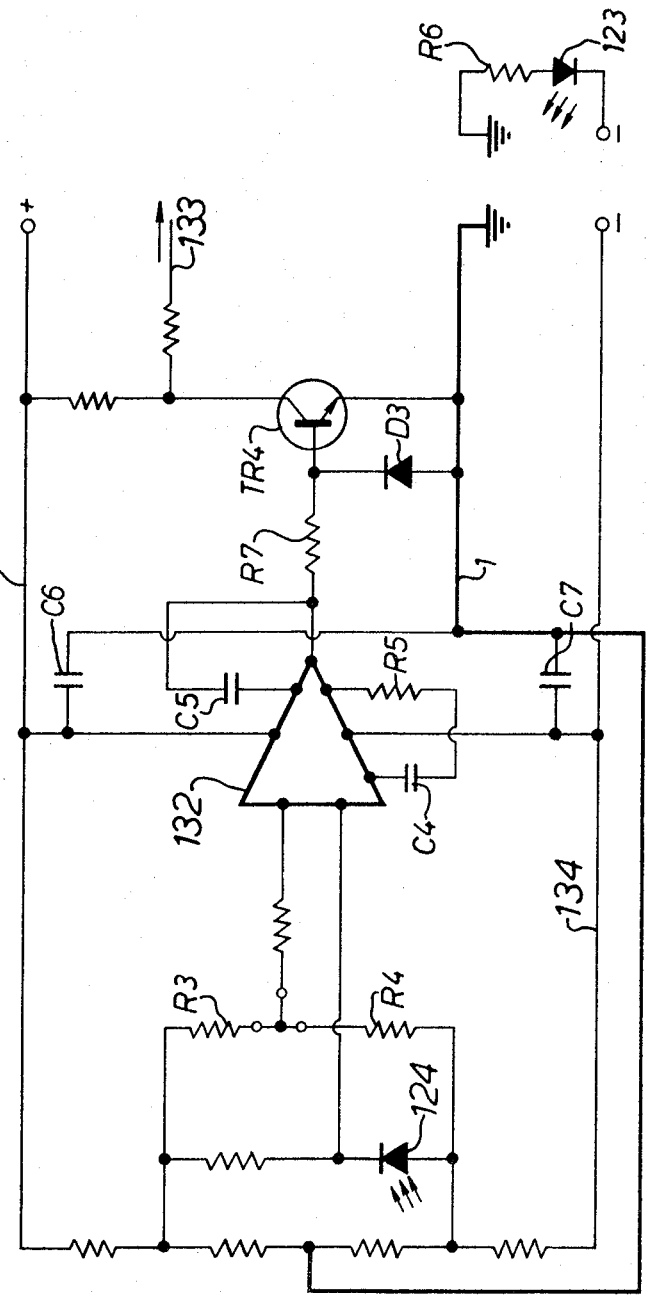
FIG. 6 is an electrical schematic diagram of the choppers amplifier of FIG. 4.

The chopper amplifier 126 is shown in more detail in FIG. 6 and comprises an operational amplifier or comparator 132 connected in a comparator mode, driving an output stage transistor TR4.

When infra-red radiation from the cell 123 is detected by the photo-diode 124, the diode resistance is reduced, and the potential at the cathode of the diode 124 falls until it is more negative with respect to the comparitor reference potential at the junction of resistors R3 and R4. At this point, the comparator 132 switches over, and its output changes rapidly from negative voltage to a positive voltage, driving transistor TR4 into saturation. The output from the collector of the transistor TR4 switches from a positive voltage to zero.

When one of the vanes of the disc 122 cuts off the radiation to the photo-diode 124, the diode resistance increases and the voltage at the cathode increases until it is more positive than the reference potential. The comparator 132 then switches back, cutting off the transistor TR4, and the output on an output conductor 133 rises.

Diode D3 prevents the base of the transistor TR4 from going too far negative. A resistor R7 limits the current from the comparator 132. Capacitors C4, C5 and resistor R5 provide frequency compensation for the comparator. Capacitors C6 and C7 decouple the conductors 134 and 135.

The cell 123 is connected in series with a resistor R6 between 0 volt and negative terminals.

Figure 7:
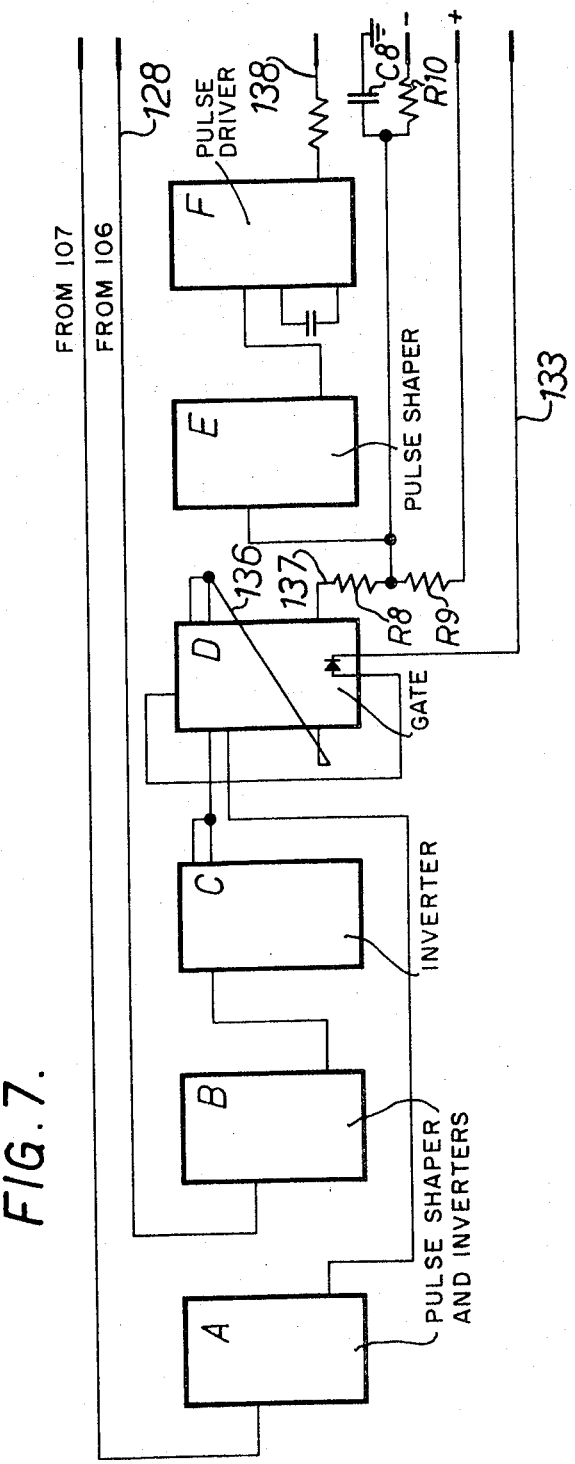
FIG. 7 is a schematic diagram of the logic unit of FIG. 4.

The logic unit 127, shown in FIG. 7, comprises commercially available MEL series 10 circuit blocks.

The signal from amplifier 106 on conductor 128 is shaped and inverted by a pulse shaper and inverter B, inverted by an inverter C, and applied to a gate D.

The inhibit signal from the chopper amplifier 126 on conductor 133 is applied directly to the gate D.

When all the inputs on the gate D are at logic '1' the output on conductor 136 falls to logic '0', i.e. the gate performs a nand function. This state will only occur when amplifier 106 is at logic '1', amplifier 107 at logic '0', and the chopper amplifier inhibit signal at logic '1'.

The output on conductor 136 is connected to the second half of the gate D, and the inverted output on conductor 137 is applied to a pulse shaper E, via resistor R8. A network comprising resistors R8, R9 and R10 and capacitor C8 delays the application of the signal to pulse shaper E for 40μ sec, to prevent a false detection in the event the leading edge of the signal from the amplifier 107 lagging the leading edge of the signal from the amplifier 106.

The output of the pulse shaper E goes to logic '0' and triggers a pulse driver F. The output of pulse driver F is a pulse of 150μ secs duration from logic '1' to logic '0' on an output conductor 138.

I claim:

1. In apparatus for detecting an object comprising means for scanning two adjacent parallel paths, and radiation responsive means associated with said scanning means for sensing radiation from said two parallel paths and indicating said object defined thereby, said radiation responsive means comprising means for producing, in response to variations in the radiation along each of said paths, signals respectively associated with said paths, and means responsive to said signals for indicating the presence or absence of the object in each of said paths, aperture means positioned between said radiation responsive means and said scanning means, said aperture means having edge portions defining limits for the lengths of the scans of said two parallel paths sensed by said radiation responsive means, the improvement comprising means for inhibiting said radiation responsive means at and adjacent the limits of the scans of said paths defined by the edge portions of said aperture means.

2. The apparatus of claim 1, wherein said scanning means comprise a movable mirror and drive means for moving the movable mirror to scan said paths, and said inhibiting means comprise a radiation source, a radiation detector connected to receive radiation from said radiation source, a shutter mounted for movement by said drive means between said radiation source and said radiation detector in synchronism with the movement of said mirror to blank said radiation detector at the limits of the scans defined by said edge portions, and said radiation detector connected to said radiation responsive means to generate signal means in response to the blanking by said shutter to inhibit said radiation responsive means.

3. The apparatus of claim 2, wherein said mirror and said shutter are mounted for rotation by said drive means, said mirror being multi-sided and said shutter having vanes corresponding to the sides of said mirror.

* * * * *